United States Patent
Nadalin et al.

(10) Patent No.: US 10,476,782 B2
(45) Date of Patent: Nov. 12, 2019

(54) SYSTEMS AND METHODS FOR ADAPTIVE ROUTING

(71) Applicant: Nexmo, Inc., San Francisco, CA (US)

(72) Inventors: Eric Nadalin, London (GB); Isabelle Lee, San Francisco, CA (US); Fernando San Martin, London (GB)

(73) Assignee: Nexmo, Inc., San Francisco, CA (US)

( * ) Notice: Subject to any disclaimer, the term of this patent is extended or adjusted under 35 U.S.C. 154(b) by 629 days.

(21) Appl. No.: 14/816,892

(22) Filed: Aug. 3, 2015

(65) Prior Publication Data
US 2017/0041213 A1     Feb. 9, 2017

(51) Int. Cl.
H04W 36/30    (2009.01)
H04L 12/707   (2013.01)
H04W 4/14     (2009.01)

(52) U.S. Cl.
CPC .............. *H04L 45/22* (2013.01); *H04L 45/24* (2013.01); *H04W 36/30* (2013.01); *H04W 4/14* (2013.01)

(58) Field of Classification Search
CPC .................. H04W 16/14; H04W 24/02; H04W 36/24–36/32; H04W 36/08; H04W 72/02
See application file for complete search history.

(56) References Cited

U.S. PATENT DOCUMENTS

| | | | |
|---|---|---|---|
| 5,720,003 A | 2/1998 | Chiang et al. | |
| 5,928,363 A | 7/1999 | Ruvolo | |
| 7,600,029 B1 * | 10/2009 | Mashinsky | H04L 41/5009 709/228 |
| 8,738,051 B2 * | 5/2014 | Nowack | H04L 29/06176 455/428 |
| 9,300,792 B2 | 3/2016 | Gonen et al. | |
| 2005/0177599 A1 * | 8/2005 | Goodman | G06Q 10/107 |

(Continued)

FOREIGN PATENT DOCUMENTS

EP    1289202 A1    3/2003
EP    2 744 158 A1  6/2014
(Continued)

OTHER PUBLICATIONS

Int'l Search Report and Written Opinion of the ISA/EP in PCT/US2015/031535; dated Aug. 25, 2015; 10pgs.
(Continued)

*Primary Examiner* — David R Lazaro
*Assistant Examiner* — Julian Chang
(74) *Attorney, Agent, or Firm* — FisherBroyles, LLP; Joseph Pagnotta

(57) ABSTRACT

Systems and methods for performing routing are described. A primary route being used to transmit a plurality of messages is identified. The primary route includes one or more channels that are each associated with a particular message type. One or more alternate routes for potentially transmitting the plurality of messages are identified, each of which also includes comprises one or more channels that are associated with a particular message type. A factor associated with the primary route is evaluated with respect to a corresponding factor associated with each alternate route and, based on the evaluation, a determination is made whether one of the alternate routes should replace the primary route for transmission of the plurality of messages.

26 Claims, 8 Drawing Sheets

(56) References Cited

U.S. PATENT DOCUMENTS

| | | | | |
|---|---|---|---|---|
| 2007/0064883 A1* | 3/2007 | Rosenthal | H04L 12/14 | 379/67.1 |
| 2008/0046922 A1* | 2/2008 | Jankins | H04N 7/17318 | 725/35 |
| 2008/0201440 A1* | 8/2008 | Shah | G06F 15/16 | 709/206 |
| 2008/0275785 A1* | 11/2008 | Altberg | G06Q 30/02 | 705/14.54 |
| 2009/0300407 A1* | 12/2009 | Kamath | G06F 9/505 | 714/4.11 |
| 2010/0031309 A1* | 2/2010 | Gale | G06Q 10/107 | 726/1 |
| 2010/0128635 A1* | 5/2010 | Buffmire | H04W 48/18 | 370/254 |
| 2010/0279737 A1* | 11/2010 | Joppek | H04M 1/24 | 455/558 |
| 2010/0304766 A1* | 12/2010 | Goyal | H04L 12/5885 | 455/466 |
| 2011/0007693 A1* | 1/2011 | Frusina | H04L 5/003 | 370/329 |
| 2011/0046814 A1* | 2/2011 | Buffmire | H04W 48/18 | 701/2 |
| 2011/0110227 A1* | 5/2011 | Yang | H04W 72/085 | 370/228 |
| 2011/0238766 A1* | 9/2011 | Lew | H04L 12/588 | 709/206 |
| 2012/0330856 A1 | 12/2012 | Hyder et al. | | |
| 2013/0023235 A1* | 1/2013 | Fan | H04W 48/18 | 455/411 |
| 2013/0036458 A1* | 2/2013 | Liberman | H04L 9/3231 | 726/6 |
| 2013/0196621 A1* | 8/2013 | Guday | H04W 24/02 | 455/406 |
| 2013/0279472 A1* | 10/2013 | Gassend | H04W 36/14 | 370/331 |
| 2014/0012674 A1* | 1/2014 | Piccionielli | G06Q 30/0257 | 705/14.55 |
| 2014/0068106 A1* | 3/2014 | Turlington | H04L 12/5691 | 709/241 |
| 2014/0075506 A1* | 3/2014 | Davis | H04L 67/12 | 726/3 |
| 2014/0075525 A1 | 3/2014 | Ferlin | | |
| 2014/0173002 A1* | 6/2014 | Frederick | H04W 12/06 | 709/206 |
| 2014/0188727 A1* | 7/2014 | Cozens | G06Q 20/10 | 705/44 |
| 2014/0254478 A1* | 9/2014 | Deshpande | H04L 45/22 | 370/328 |
| 2014/0282747 A1* | 9/2014 | Richman | H04W 76/026 | 725/62 |
| 2014/0313882 A1* | 10/2014 | Rucker | H04W 4/005 | 370/219 |
| 2014/0337473 A1* | 11/2014 | Frusina | H04L 5/003 | 709/217 |
| 2015/0055608 A1* | 2/2015 | Egner | H04W 4/028 | 370/329 |
| 2015/0056960 A1* | 2/2015 | Egner | H04W 12/08 | 455/411 |
| 2015/0094011 A1* | 4/2015 | Haessler | H04W 4/22 | 455/404.1 |
| 2015/0094071 A1* | 4/2015 | Hang | H04W 76/028 | 455/450 |
| 2015/0125147 A1* | 5/2015 | Zhang | H04Q 11/0067 | 398/58 |
| 2015/0296520 A1* | 10/2015 | Batchu | H04W 72/0493 | 455/434 |
| 2015/0381571 A1* | 12/2015 | Plasse | H04L 51/00 | 726/26 |
| 2016/0029248 A1* | 1/2016 | Syed | H04W 28/08 | 370/235 |
| 2016/0095157 A1* | 3/2016 | Wenzel | H04W 76/04 | 370/329 |
| 2016/0112941 A1* | 4/2016 | Desai | H04L 12/145 | 370/329 |
| 2016/0127370 A1* | 5/2016 | Hettervik | H04L 63/0884 | 726/7 |
| 2016/0164883 A1* | 6/2016 | Li | H04W 4/008 | 726/7 |
| 2016/0210209 A1* | 7/2016 | Verkaik | G06F 11/2033 | |
| 2016/0219608 A1* | 7/2016 | Awoniyi-Oteri | H04W 72/1215 | |
| 2016/0219648 A1* | 7/2016 | Awoniyi-Oteri | H04W 8/205 | |
| 2016/0249186 A1* | 8/2016 | Dumov | H04W 4/12 | |
| 2016/0249223 A1* | 8/2016 | Egner | H04W 16/14 | |
| 2016/0286526 A1* | 9/2016 | Shirazi | H04M 15/61 | |
| 2017/0019414 A1* | 1/2017 | Kacin | H04L 63/108 | |

FOREIGN PATENT DOCUMENTS

| | | |
|---|---|---|
| JP | 2008-131346 A | 6/2008 |
| JP | 2012-205143 A | 10/2012 |
| JP | 2014-072537 A | 4/2014 |
| WO | WO-03/063411 A1 | 7/2003 |
| WO | WO-2011/132181 A1 | 10/2011 |
| WO | WO-2012/006659 A1 | 1/2012 |

OTHER PUBLICATIONS

Nexmo SMS Deliverability Guide; https://web.archive.org/web/20121021023442/http://nexmo.com/download/nexmo_sms_deliverability guide.pdf; Oct. 21, 2012; 10pgs.

Sep. 6, 2016 International Search Report issued in International Application No. PCT/US2016/043849.

Sep. 6, 2016 Written Opinion issued in International Application No. PCT/US2016/043849.

* cited by examiner

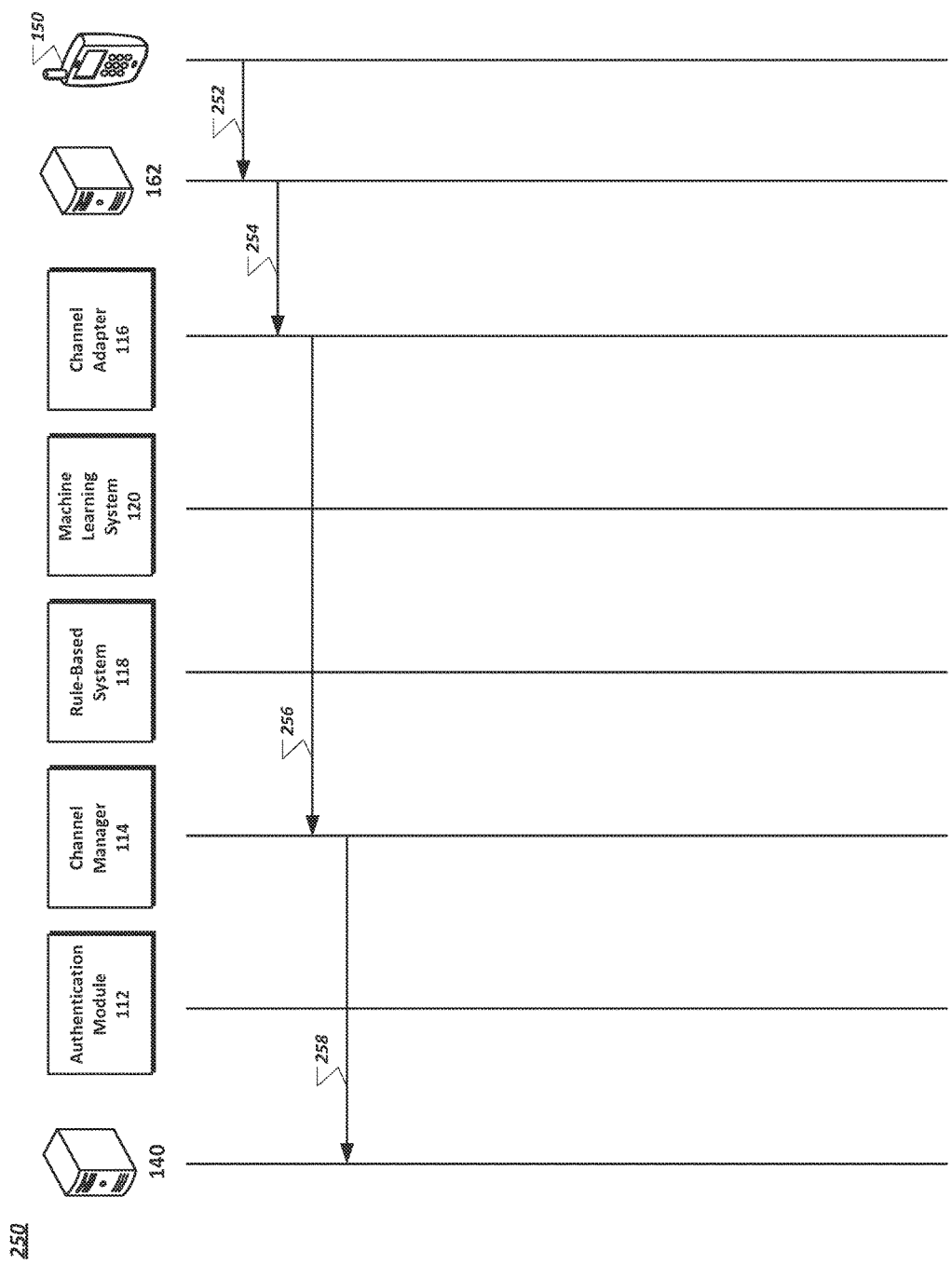

SYSTEMS AND METHODS FOR ADAPTIVE ROUTING

BACKGROUND

The present disclosure relates generally to network communications and, more particularly, to systems and methods for performing routing based on conversion data, channel properties, and/or other network metrics.

Communications network pathways can experience congestion and the consequent slowing or failure of data delivery when the pathways become overloaded with traffic and, in some jurisdictions, are generally unreliable. In these circumstances, text messages and other data transfers over communications networks may arrive late or not reach their intended recipients at all, resulting in the loss of customers, end user complaints, increased cost of user acquisition, and financial detriment. Too often, unfortunately, the industry is driven by least-cost routing, rather than quality control, resulting in the persistence of these problems. Carriers, service providers, and end users alike would benefit from a network routing solution that addresses these shortcomings and provides an enhanced level of communications service for business-critical applications.

BRIEF SUMMARY

Systems and methods for message routing are provided herein. In one aspect, a computer-implemented method includes: identifying a primary route being used to transmit a plurality of messages, wherein the primary route comprises one or more channels each associated with a particular message type; identifying one or more alternate routes for potentially transmitting the plurality of messages, wherein each alternate route comprises one or more channels each associated with a particular message type; evaluating a factor associated with the primary route with respect to a corresponding factor associated with each alternate route; and based on the evaluation, determining whether one of the alternate routes should replace the primary route for transmission of the plurality of messages.

In one implementation, the factor includes a property of a particular channel, the property including one of quality of service, delivery receipt availability, delivery receipt delay, recipient reachability, communication regulations or restrictions, cost, and user preference.

In another implementation, the method further includes tracking over a period of time first network metric data of a channel of the primary route and second network metric data of a channel of a particular alternate route, wherein the factor includes channel quality of service, and wherein evaluating the factor comprises: determining, based on the first network metric data, a quality of service of the channel of the primary route; and determining, based on the second network metric data, a quality of service of the channel of the particular alternate route.

In a further implementation, the method further includes tracking over a period of time an average length of time to receive a delivery receipt based on a transmitted message over a particular channel of the primary route, wherein the factor includes channel delivery receipt delay, and wherein evaluating the factor comprises determining that the delivery receipt delay of the particular channel of the primary route exceeds a maximum delay threshold.

In yet another implementation, the method further includes receiving indications of transmission of a subplurality of messages wherein the transmission occurs over the primary route; and receiving, for at least one of the subplurality of messages, an indication of a conversion based on the at least one message, wherein the factor includes route quality, and wherein evaluating the factor comprises determining a quality of the primary route based on at least a subset of the indications of transmission and at least a subset of the indications of conversion. A particular conversion can include a verification of delivery of the message based on a response to the message.

In one implementation, evaluating the factor includes predicting whether a change in a value of the factor is likely to occur. The predicting can be based on a risk measure and/or historical attributes associated with the primary route.

In another implementation, determining whether an alternate route should replace the primary route includes selecting one of the plurality of alternate routes based at least in part on the corresponding factor associated with selected alternate route. The method can further include redesignating the primary route as an alternate route. A articular message can include identity verification information, and a particular message type can include a text message, a multimedia message, or a voice message.

Other aspects of the invention include corresponding systems and non-transitory computer-readable media. The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which:

FIG. 3B is a data flow diagram of an example inbound message receipt.

DETAILED DESCRIPTION

Figure 1:
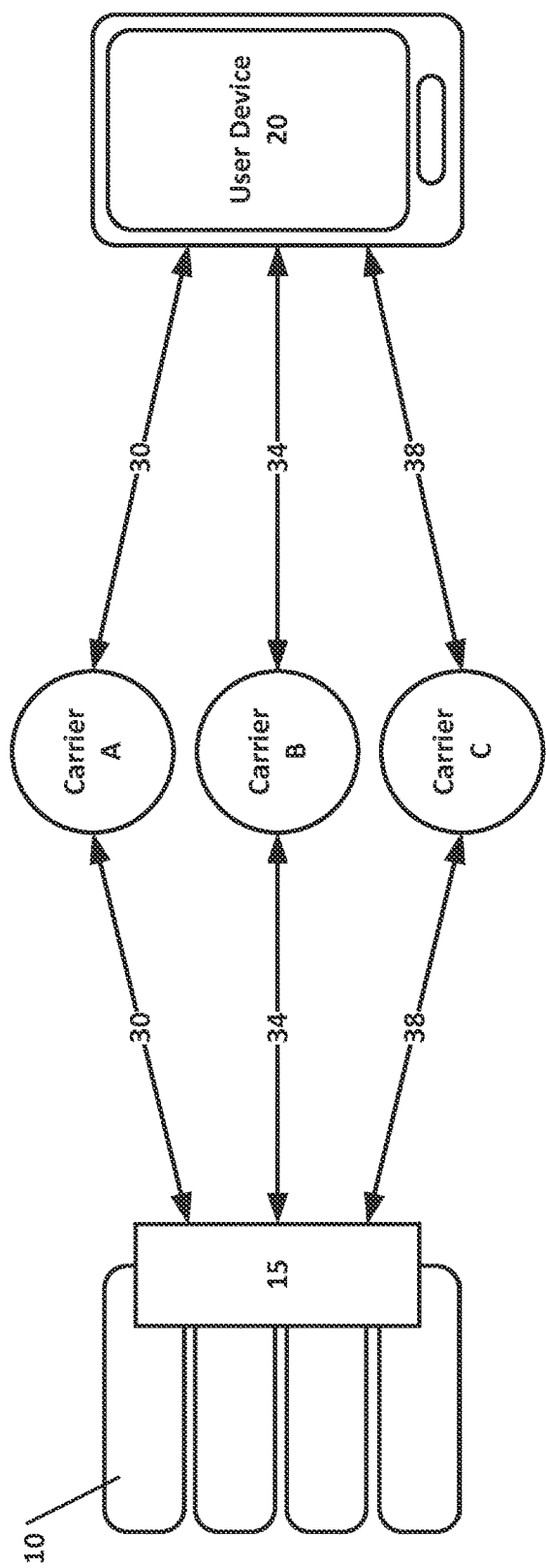
FIG. 1 is a diagram depicting an example system network architecture according to an implementation.

In various implementations, systems and methods for routing based on various network properties and metrics described herein. Routing or adaptive routing refers to the redirection and/or specification of one or more alternate pathways or channels for traffic over a communications network in response to preferences, conditions or metrics (e.g., conversion data, predictions, quality, cost, delivery receipt availability, payment ability, bandwidth, latency, loss, jitter, etc.) associated with one or more pathways, channels and/or traffic transmitted over the pathway(s). A network pathway, or route, can include zero or more hops between a source and destination, and can include a connection to a carrier, such as a mobile network operator. A channel can include a service for communication over a network pathway, such as over-the-top (OTT) messaging service, short messaging service (SMS), voice, text-to-speech, IP to IP (for voice, and WebRTC), public switched telephone network (PSTN), cellular network, and the like.

In one example, the majority of network traffic is directed over a primary route, and the remainder of the traffic is split among one or more alternate routes. Upon determining that the quality of the primary route has deteriorated by a certain amount, one of the alternate routes is selected to replace the primary. The quality of a particular route can be a measure of the reliability of the route over time, and can be determined based on route conditions or metrics such as conversion data and predictions. Other reasons for selecting alternate routes are described herein.

As referred to herein, a "conversion" can be a successful verification of the delivery of a message based on a response to that message (e.g., an action taken by the recipient, a log-in, an activation, a registration, a confirmation sent to a routing controller, a verification based on a token, and so on). In one example, a conversion is an action taken by the message recipient to verify his identity based on information included in the transmitted message. In such an situation, the message information can include a personal identification number (PIN), registration code, activation code, password, pass phrase, or other unique identifier that can be used to associate or link a user or device with an account, a registration, a device, an application, and so on. In some implementations, a conversion represents a successful two-factor authentication process. For example, a user attempting to log into an online banking system can be sent a PIN code via a short messaging service (SMS) to the phone number associated with the account. The user must enter the PIN code to verify his identity (e.g., that he is associated with the mobile phone for the account), thereby adding an additional layer of identification to the login process. The validation of the user's identity through entry of the valid PIN code constitutes a conversion. In another example, a delivery receipt received from a carrier indicating that a message was successfully transmitted to a particular recipient is a conversion. In a further example, a conversion can be generated using a token, as described further herein.

FIG. 1 illustrates one implementation of a simple network communication system for routing messages over a network. One or more servers 10 communicate with one or more user devices 20 over various routes (e.g., routes 30, 34 and 38) of a communications network. Servers 10 can also communicate with each other and/or other servers over the communications network. Likewise, the user devices 20 can communicate with each other or with other devices over the communications network. The server 10 can include an application 15 having an application programming interface (API) that facilitates sending and/or receiving information through one or more carriers (e.g., Carrier A, Carrier B, and Carrier C) over the respective routes 30, 34, and 38. The application 115 can be used to create and transmit messages including identity verification information (e.g., PIN, registration code, etc.) directed to a particular user device 20. The application 15 can also receive and process delivery receipts sent by carriers indicating that a particular message has been successfully received (or was unable to be received) by a user device 20. Further, the application 15 can receive and process notices indicating that conversions have occurred based on a previously transmitted message, as well as messages responding to originally sent messages.

In one implementation, the application 15 generates a unique token and includes it in a transmitted message to a recipient (along with, e.g., a PIN code or other verifying information). Upon receiving the message, the recipient can provide the message information (PIN code and unique token) to a requesting application, which relays the information to the server application 15 for validation. Upon determining the validity of the PIN code and token, the application 15 can generate a conversion corresponding to the originally transmitted message.

Figure 2:
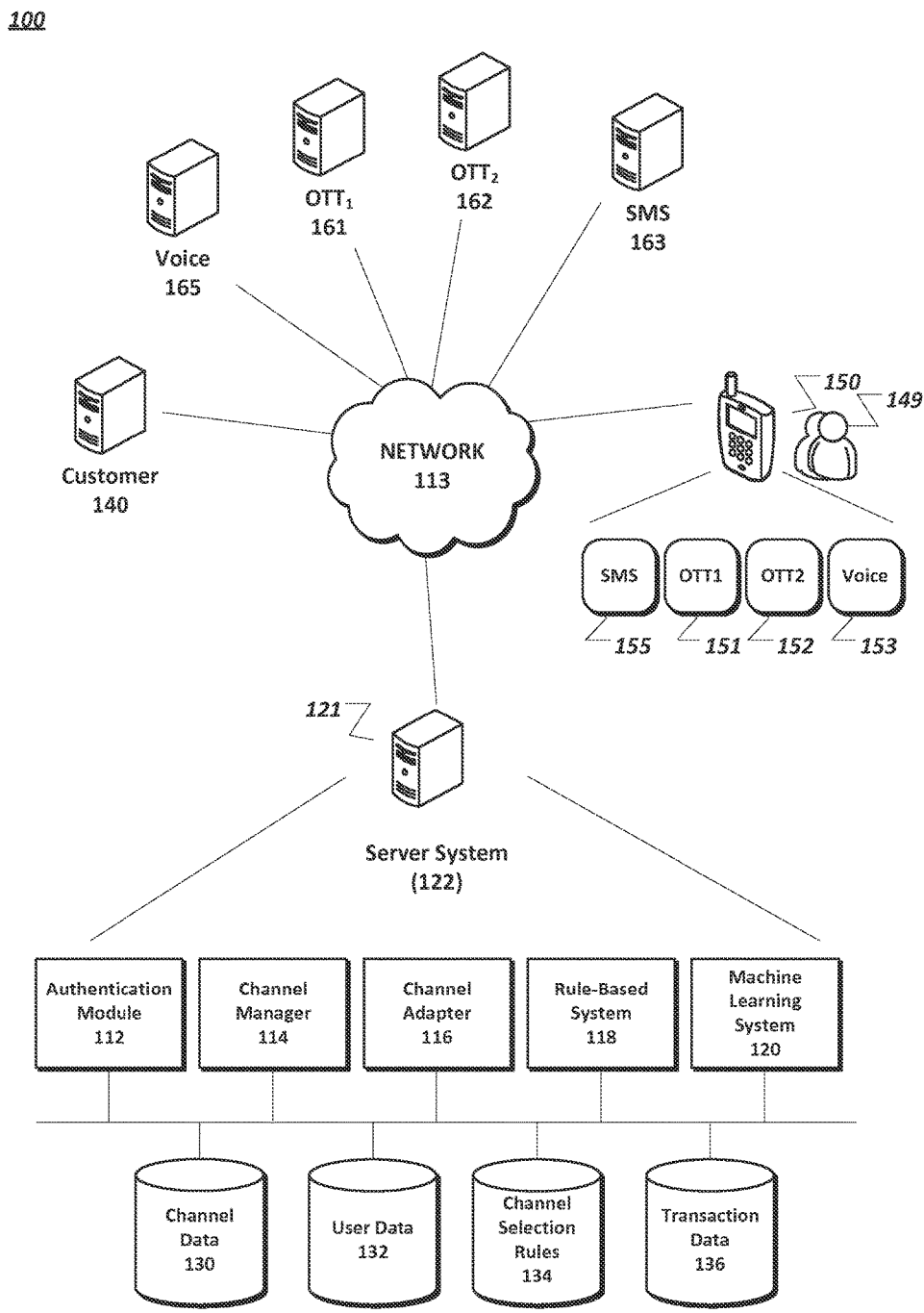
FIG. 2 is a diagram depicting an example system network architecture according to an implementation.

FIG. 2 illustrates an implementation of a system for network communication over multiple routes and/or channels. The server system 122 implements functionality to facilitate communication with users using a variety of different types of communication channels. In particular, the server system 122 manages communications between third parties such as businesses (e.g., customer 140) and users (e.g., user 149) by means of OTT messaging services (e.g., $OTT_1$ 161, $OTT_2$ 162), Voice over IP, WebRTC, and other voice services (e.g., Voice 165), short messaging services (e.g., SMS 163), public switched telephone networks (PSTNs), cellular networks (e.g., GSM networks), video-conferencing services, or other communications services. The server system 122 comprises software components and databases that can be deployed at one or more data centers 121 in one or more geographic locations. The software components can comprise subcomponents that can execute on the same or on different individual data processing apparatus.

In various implementations, the primary server system 122 software components comprise an authentication module 112, a channel manager 114, a channel adapter 116, a rule-based system 118, and a machine learning system 120. The authentication module 112 authenticates customers, users or both with the server system 122 and, optionally, with a selected communication channel (e.g., $OTT_2$ 162). The channel manager 114 is responsible for selecting communication channels to use and for facilitating communication between customers and users. An application programming interface (API) can be used by customers' computer systems (e.g., customer 140) to communicate with the channel manager 114. The API can be provided to customers in a software library (e.g., in a software development kit or SDK). In some implementations, the API implements a communication protocol that supports message sending and authentication. (The API will be described further below.) The channel adaptor 116 communicates with the service (e.g., $OTT_1$ 161) for a communication channel selected by the channel manager 114 in order to send and receive messages on the selected channel and, optionally, perform authentication. The rule-based system 118 and the machine learning system 120, discussed further below, are systems that can be used by the channel manager 114 to select a communication channel to use for a given communication. The server system 122 databases comprise a channel data database 130, user data database 132, channel selection rules database 134, and transaction data database 136. The databases can reside in one or more physical storage systems.

Client devices (e.g., client device 150) execute one or more software applications that allow users (e.g., user 149) to obtain and send messages, and establish other types of communications such as voice and video calls. For example, software applications 155, 151, 152, and 153 on the client device 150 allow the user 149 to communicate using SMS, OTT$_1$, OTT$_2$ and Voice, respectively. The client device 150 can be a data processing apparatus such as a mobile phone, a smart watch, a tablet computer, a personal computer, a game console, or an in-car media system. Other examples of client devices are contemplated.

Various implementations of the systems described herein can use appropriate hardware or software; for example, the server applications described herein can execute on server class computers that have sufficient memory, data storage, and processing power and that run a server class operating system (e.g., Oracle® Solaris®, GNU/Linux®, and the Microsoft® Windows® family of operating systems) or other hardware capable of running an operating system such as the Microsoft Windows® operating systems, the Apple OS X® operating systems, the Apple iOS® platform, the Google Android™ platform, the Linux® operating system and other variants of UNIX® operating systems, and the like. The systems can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

User and client devices can include, but are not limited to, smart phones, smart watches, smart glasses, tablet computers, portable computers, televisions, gaming devices, music players, mobile telephones, laptops, palmtops, smart or dumb terminals, network computers, personal digital assistants, wireless devices, information appliances, workstations, minicomputers, mainframe computers, or other computing device that are operated as general purpose computers or a special purpose hardware devices that can execute the functionality described herein.

Communication between the various servers and devices can take place over a communications network using media such as standard telephone lines, LAN or WAN links (e.g., T1, T3, 56kb, X.25), broadband connections (ISDN, Frame Relay, ATM), wireless links (802.11 (Wi-Fi), Bluetooth, ZigBee, Z-Wave, GSM, TD-CDMA, TD-SCDMA, CDMA, SMS over radio, fiber optics, etc.), for example. Other communication media are contemplated. The network can carry TCP/IP protocol communications, HTTP/HTTPS transmissions, and so on, and the connection between the user devices and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and the modules can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store instructions that, when executed by a processor, form the modules and other components described herein and perform the functionality associated with the components. The processor and the memory can be supplemented by, or incorporated in special purpose logic circuitry.

The systems can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Referring still to FIG. 2, the customer 140 computer system can send a request for transmitting a message to the server system 122 using a communication protocol implemented by the aforementioned API. In some implementations, API requests are submitted by the customer 140 to the server system 122 using Hypertext Transfer Protocol (HTTP) POST or GET methods where the parameters of the requests are in External Markup Language (XML) or JavaScript Object Notation (JSON) format. By way of illustration, a request to send a message to a user can include the following parameters: message content, optional authentication information, identification of the sender and the recipient of the message, and a message content type. Other parameters are possible. The message content type can indicate that the message is text or rich media (e.g., an image, video, audio, executable code, or programming language statements). If the message content type is rich media, the message can in some implementations include an address (e.g., a uniform resource locator address) from which the message can be obtained by the message recipient. That is, the request does not need to include the message content itself.

In various implementations, the sender, the recipient, or both can be specified in a Uniform Resource Identifier (URI) format. In some implementations, the URI format is as follows (however other URI formats are contemplated):

<scheme>:<channel>:<user identifier>

The scheme field specifies a type of communication channel, for example, "OTT" for an OTT channel, "SMS" for an SMS channel, or "PSTN" for a public telephone network. Other types of communication schemes are contemplated. The channel field specifies a particular service for the communication channel, for example, "WeChat" for the WeChat messaging service, "LINE" for LINE messaging service, or "tel" for telephone service. The user identifier field specifies the user identifier of the recipient for the particular service. The user identifier can be a phone number of a user, a user account name (e.g., a text string) for the particular channel, or an identifier that can be mapped to an identifier for the channel. In some implementations, the sender is specified using a key or a Uniform Resource Locator (URL) address of the sender, for example.

The server system 122 receives the request to send the message from the customer 140 and optionally authenticates the request. The message can be sent on the scheme:channel specified by the sender identification or the server system 122 can select a scheme:channel (using the channel manager 114) to send the message on. The authentication module 112 is a software component that validates that the request was submitted by an authorized user of the server system 122. For instance, the authentication module 112 can authenticate one or more cryptographic keys included in the authentication information parameter of the request using public key cryptography. Other types of authentication are contemplated.

The channel manager 114 is a software component that selects a communication channel for transmitting the message based on one or more properties. The properties are stored in the channel data 130 database for access by the channel manager 114. In some implementations, the channel properties can include one or more of those listed below in TABLE 1. These properties can be used for in selecting a route and/or channel for data transmission, as further described herein. Other channel properties are contemplated.

TABLE 1

| Property | Description |
| --- | --- |
| Quality of Service | A measure of the performance of the channel based on, e.g., network metric data such as message delivery failure rate, transmission delay, queues, maintenance periods, delivery confirmation, packet loss, available features (e.g., text vs. rich-media content), or OTT restrictions. |
| Delivery Receipts | A measure of availability of a delivery receipt and how long it takes on average for a delivery receipt to be received indicating delivery of the message to the user on the channel. This measure can further be based on accuracy and content (e.g., message delivered, message read) of a delivery receipt |
| Reachability of Recipient | A measure of the likelihood that the message will be viewed by the user on the channel. This measure can further be based on the day of the week and time of day, holidays, and validity of parameters provided, recipient account status, purpose and nature of a recipient account in relation to the message type, content of the message, or channel restriction, for example. |
| Communication Regulations, | An indication of whether the channel can be used based on the content type, country or region that |

TABLE 1-continued

| Property | Description |
| --- | --- |
| Laws, or Regional Requirements | recipient is located, country or region that sender is located, time of the day, sender identification in message, length of numbers, length of message, export or import restriction, privacy, or data security. |
| Cost | The cost of delivering a message on a particular channel based on cost information provided by the channel service, or whether revenue can be obtained by the sender via the channel. |
| User Preferences | An indication of whether the recipient favors the channel for communication, an order of attempted channels, or type of message. |

The channel manager 114 can determine one or more of the properties in TABLE 1 by observing how a given channel behaves over time for a given user or multiple users. The channel manager 114 can also select a communication channel based on the sender's identification (the customer 140) or additional criteria specified by the sender. For instance, the sender may have an upper limit (e.g., $0.05, or $0.00) on a cost to send a message. As for another example, the sender may have a preference for one OTT channel over another OTT channel, or in SMS messaging over an OTT channel.

In some implementations, the channel manager 114 selects a communication channel based on evaluation of one or more rules using the rule-based system 118. Each rule in the rule-based system 118 includes one or more required properties for the message, and a channel suitable for the required properties. A required property for the message can be the content type (e.g., text or rich-media), a cost limit specified by the sender, or a delivery success rate specified by the sender, or the value of a property listed in TABLE 1. Other required properties for the message are possible. The required properties can be determined by metadata (e.g., the content type, the sender) of the message.

The set of rules can be stored in the channel selection rules database 134. By way of illustration, assume that there are four required properties A, B, C, and D. The set of rules can include:

| Rule | Required properties | Channel |
| --- | --- | --- |
| #1 | A B C D | $OTT_1$ |
| #2 | B C D | $OTT_2$ |
| #3 | B D | $OTT_1$ |
| #4 | A | SMS |
| #5 | B | $OTT_2$ |
| #6 | D | $OTT_2$ |

For instance, if the required properties for the message are B and D, the rule-based system 118 accesses the above set of rules (stored in the channel selection rules database 134) and selects the channel $OTT_1$ for transmitting the message. If the required properties for the message are A only, the rule-based system 118 accesses the above set of rules and selects the channel SMS for transmitting the message. The rule-based system 118 can provide the selected channel to the channel manager 114 that manages transmitting the message through the selected channel, as will be further described later. In some implementations, each rule corresponds to an ordered list of communication channels, including a primary channel and one or more secondary channels. The secondary channels serve as failover channels if transmission through the primary channel is unsuccessful (further described below).

The machine-learning system 120 is a software component that periodically updates the rules stored in the channel selection rules 134 based on past performance data for each property on each of the communication channels (e.g., properties described in TABLE 1 above). For instance, the machine-learning system 120 can access the transaction data database 136 for performance data for the past 5 minutes (or past one hour, past week, past month). For instance, if a particular property under consideration is the content type of rich-media, performance data of a particular channel for this particular property can be numbers of success and failed transmissions of rich-media messages through the particular channel in the past 5 minutes. As for another example, if a particular property under consideration is the quality of service of a particular channel, performance data for this particular property can be the number of events when the particular channel is unavailable or the number of messages that were automatically sent (failover) through other channels in the past hour. Other examples of past performance data for a particular channel can include downtime, user availability, cost efficiency, revenue efficiency, and automatic failover after a specified amount of latency (or queuing, packet loss). The machine-learning system 120 uses the past performance data as input to a machine-learning algorithm to update the channel-selection rules stored in the channel selection rules database 134. The machine-learning algorithm can be association rule learning algorithms such as Apriori algorithm and FP (frequency pattern) growth algorithm, or supervised learning algorithm such as decision trees, support vector machine, or kernel estimation. Other machine-learning algorithms are possible.

Once the channel is selected by the channel manager 114, the message can be sent to the recipient using the channel adaptor 116. The channel adaptor 116 performs any necessary format conversion of the message content to make the message compatible with the selected channel and then sends the message to the recipient using a communication protocol specified by the selected channel. The transaction data database 136 can store transaction information for each request to send a message using a particular channel, such as identifiers for sender and recipient, message type, a transmission status (e.g., success or fail), delivery receipt, cost and payment for the transmission, and timestamp.

Figure 3A:
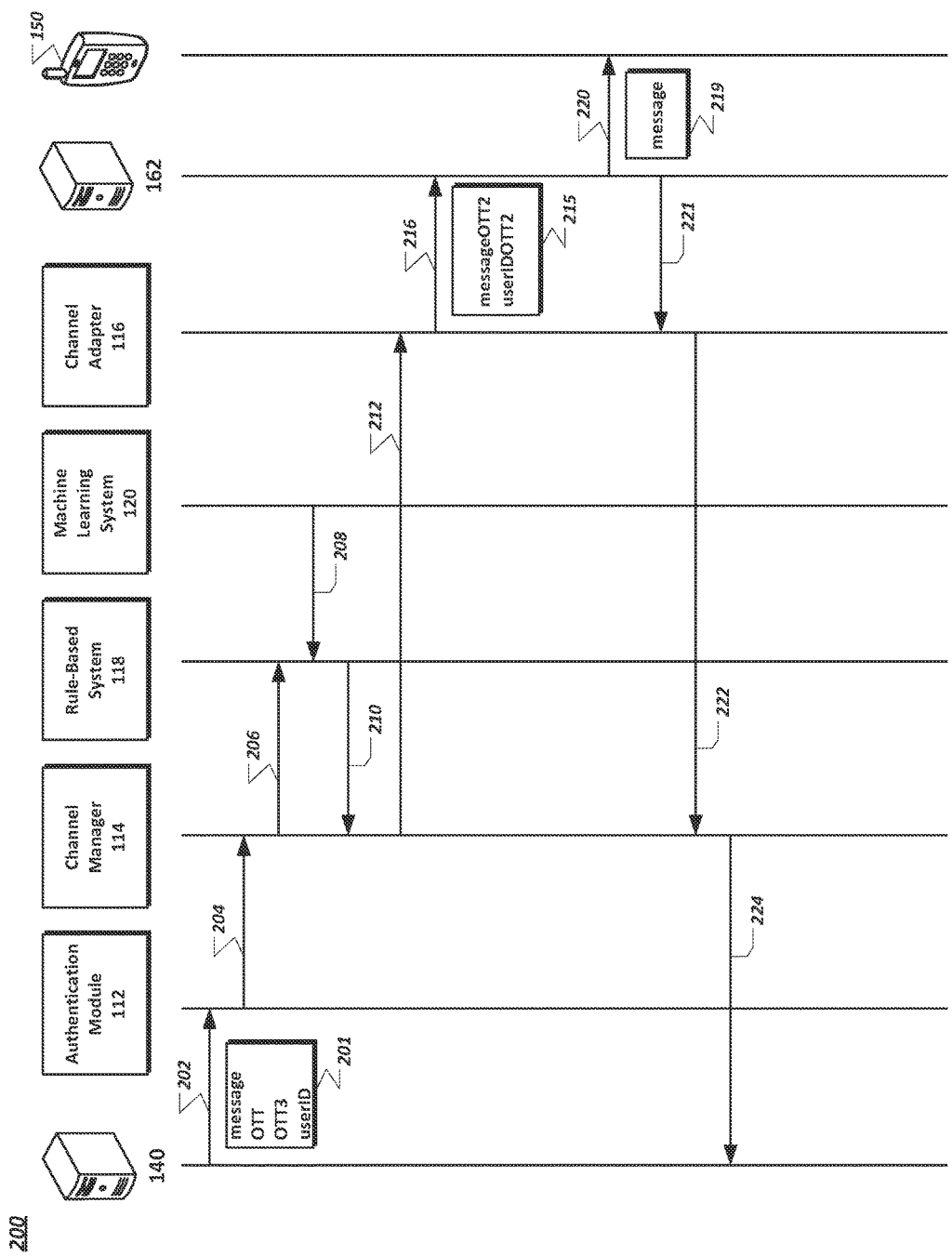
FIG. 3A is a data flow diagram of an example outbound message transmission.

FIG. 3A is a data flow diagram for an example transmission of an outbound message using the server system 122). In FIG. 3A, the customer 140 sends a request 201 to transmitting a message to the server system 122 using the aforementioned API (202). The request 201 can be submitted through HTTP POST or GET method using UTF-8 encoding and URL encoded values, for example. As described earlier, the request can specify an OTT channel such as $OTT_3$ 163, and a phone number (e.g., of the client device 150) as the user identifier for the user (recipient).

The authentication module 112 first authenticates the request 201 by using cryptographic keys included in the request 201, for example. After authenticating the request 201, the authentication module 112 forwards the request 201 to the channel manager 114 (204).

The channel manager 114 can determine available communication channels to reach the user. For instance, the channel manager 114 can access the user data database 132 (based on the phone number) for available communication channels to reach the recipient. Available communication channels for a user can be obtained (e.g., by the channel manager 114 or another software component of the server system 122) based on transaction data of past message deliveries. The channel manager 114 can also send to servers of a particular messaging service provider a message including the phone number (e.g., using an API of the particular messaging service provider), requesting a confirmation on whether the user is reachable through the particular messaging channel, and in an implementation, obtaining a user identifier (of the user) for the particular messaging channel.

In some implementations, the channel manager 114 sends to servers of a particular messaging service provider a message (e.g., using an API of the particular messaging service provider), requesting a confirmation on whether the particular messaging service accepting messages originated from the sender (the customer 140). For instance, the particular messaging service provider may only process messages from a business after the business have registered with the particular messaging service provider.

In some implementations, the channel manager 114 sends the available channels to the rule-based system 118 (206). The rule-based system 118 can select a communication channel based on rules for required properties of the message as described earlier, and provides the selected communication channel to the channel manager 114 (210). As the rule-based system 118 automatically selects a communication channel based on rules for required properties of the message, the selected communication channel is not necessarily the same communication channel (OTT3) specified by the customer 140. Optionally, the machine learning system 120 can use past performance data as input to a machine-learning algorithm to update the channel selection rules and provide the updated rules to the rule-based system 118 (208), for example, by updating the rules stored in the channel selection rules database 134.

The channel manager 114 can provide the selected communication channel (e.g., OTT2) and the request 201 to the channel adapter 116 (212). The channel adapter 116 translates the request 201 to a request 215 (to transmit the message) according to a protocol (e.g., an API) for the selected communication channel. For instance, the request 215 can include the message from the request 201 but in a format based the protocol of the OTT2 channel, and a user identifier (of the user) for the OTT2 channel. The request 215 can also include an identifier for the customer 140 such that a future reply message in reference to the request 215 can be directed toward back to the customer 140. The channel manager 114 then forwards the request 215 to servers of the OTT2 channel 162 (216). The servers of the OTT2 channel 162 then forward the message 219 to the client device 150 of the recipient (220). The user can access the message 219 from a user interface of the OTT2 application running on the client device 150.

In some implementations, the servers of the OTT2 channel 162 sends a delivery receipt (e.g., a notification confirming the delivery of the message to the client device 150) to the channel adapter 116 (221), based on the protocol of the OTT2 channel. The channel adapter 116 the forwards the delivery receipt to the channel manager 114 (222).

The channel manager 114 can send a response (to the original request 201) to the servers of the customer 140, for example, through the API of the server system 122 (224). The response can be structured data in JSON or XML format, for example. The response can include an identifier for the message, the channel through which the message was delivered (e.g., OTT2). The response can also include billing information such as payment and remaining balance, and an indication of the delivery receipt (or a status of successful delivery). If the message was not delivered successfully, the response can include a failed status, one or more reasons for the failed delivery (e.g., all available communications are busy, missing or invalid parameters in the original request, balance is too low, and so on). Meanwhile, the channel manager 114 can store transaction information for the request 202 in the transaction data database 136.

If the channel manager 114 determines that the message 215 is not delivered to the client device 150 (e.g., based on a notification from the servers 162), or a conversion event has not happened within a specified time period (e.g., 45 seconds), the channel manager 114 can select another communication channel to transmit the message. The channel manager 114 can select another communication channel based on one or more failover rules. The failover rules can identify one or more failover (or secondary) communication channels.

In one implementation, the failover rules are based at least in part on destination or client requirements (e.g., a client may limit a transmitting cost when the failover channel is SMS messaging). The failover rules can also be based at least in part on a device type of the destination device For example, if the destination device is a cellular phone, the primary channel can be an SMS message service, and the failover channel can be a voice channel or the same or another SMS service. As another example, if the destination device is a land-line phone, the phone's voice channel can be designated as the primary and failover channels, since messaging services may not be available for the land-line phone. In another implementation, the failover rules are based at least in part on local regulation of respective carriers of the channels. For instance, local regulation may prohibit text messages delivered to a phone number without an existing consent (e.g., not on a do-not-call list) or a pre-approved code. If an existing consent or a pre-approved code is not available for the phone number for the destination device, the channel manager 114 can designate the voice channel of the phone number as the primary and failover channels.

In another implementation, the failover rules are based at least in part on performance data (e.g., past and/or current performance data) of one or more channels (e.g., the primary and secondary channels). Performance data of a particular communication channel can be a conversion rate of the channel (e.g., a ratio of a number of conversion events to a total number of messages sent via the channel over a period of time, such as the previous month). In some implementations, a conversion rate is for a group of phone numbers, such as phone numbers having a same prefix in North America Numbering plan (e.g., phone numbers from (415) 575-0000 to (415) 575-9999). Performance data of a communication channel can be a current connection status (e.g., currently available, intermittently available for the past five minutes, or currently unavailable) of the communication channel. For instance, channel manager 114 can designate a channel that is currently available as the primary channel and another channel that is intermittently available as a secondary channel.

The channels can be periodically ranked based on respective performance data, and primary and secondary channels can be identified based on the ranking. For instance, the available channels can be ranked based on respective conversion rates, and a channel with the highest conversion rate can be designated as the primary channel, another channel with the second highest conversion rate can be designated as a "first" secondary channel, and so on.

In some implementations, the failover rules are based on a pre-defined ordering of channels. For instance, a particular customer may prefer a particular workflow of an ordered list of communication channels (e.g., SMS, voice, voice). In other implementations, only a primary channel only is used (i.e., no failover channel exists). In other words, only one attempt of delivering a message to a destination device is performed by the channel manager 114.

Referring still to FIG. 3A, assuming that the selected (failover) channel is OTT1, the channel adapter 116 can translate the request 201 to another request for transmitting the message according to a protocol (e.g., an API) for the OTT1 channel. The channel manager 114 then forwards the other request to servers of the OTT1 channel, which in turns forwards the message to the client device 150. The user can access the message from a user interface of the OTT1 application running on the client device 150. The servers of the OTT1 channel can also provide a delivery confirmation to the channel manager 114 (via the channel adapter 116), which in turns can provides the delivery confirmation to the servers of the customer 140 (e.g., using the API of the server system 122).

FIG. 3B is a data flow diagram for transmitting an inbound message using the flexible message delivery system (the server system 122) in reference to FIG. 2. The user (the recipient) can send a reply message to the servers of the OTT2 channel 162 (252). The servers of the OTT channel 162 in turn send the reply message to the channel adapter 116 according to the protocol of the OTT2 channel (254). The servers of the OTT channel 162 can reference the original request 215 (FIG. 3A) and the identifier for the customers 140 included in the original request 215 (as described earlier), and indicate to the channel adapter 116 that the reply message is directed toward the customer 140. The channel adapter 116 provides the reply message to the channel manager 114 (256). The channel manager 114 then can forward the reply message to the servers of the customer 140 by using the API of the server system 122 (258). For instance, the channel manager 114 can send a request (e.g., via HTTP GET) to a call-back URL address of the servers of the customer 140. The request can include the user's identifier for the OTT2 channel (in the URI format described earlier), content type of the reply message, and the reply message.

Figure 4:
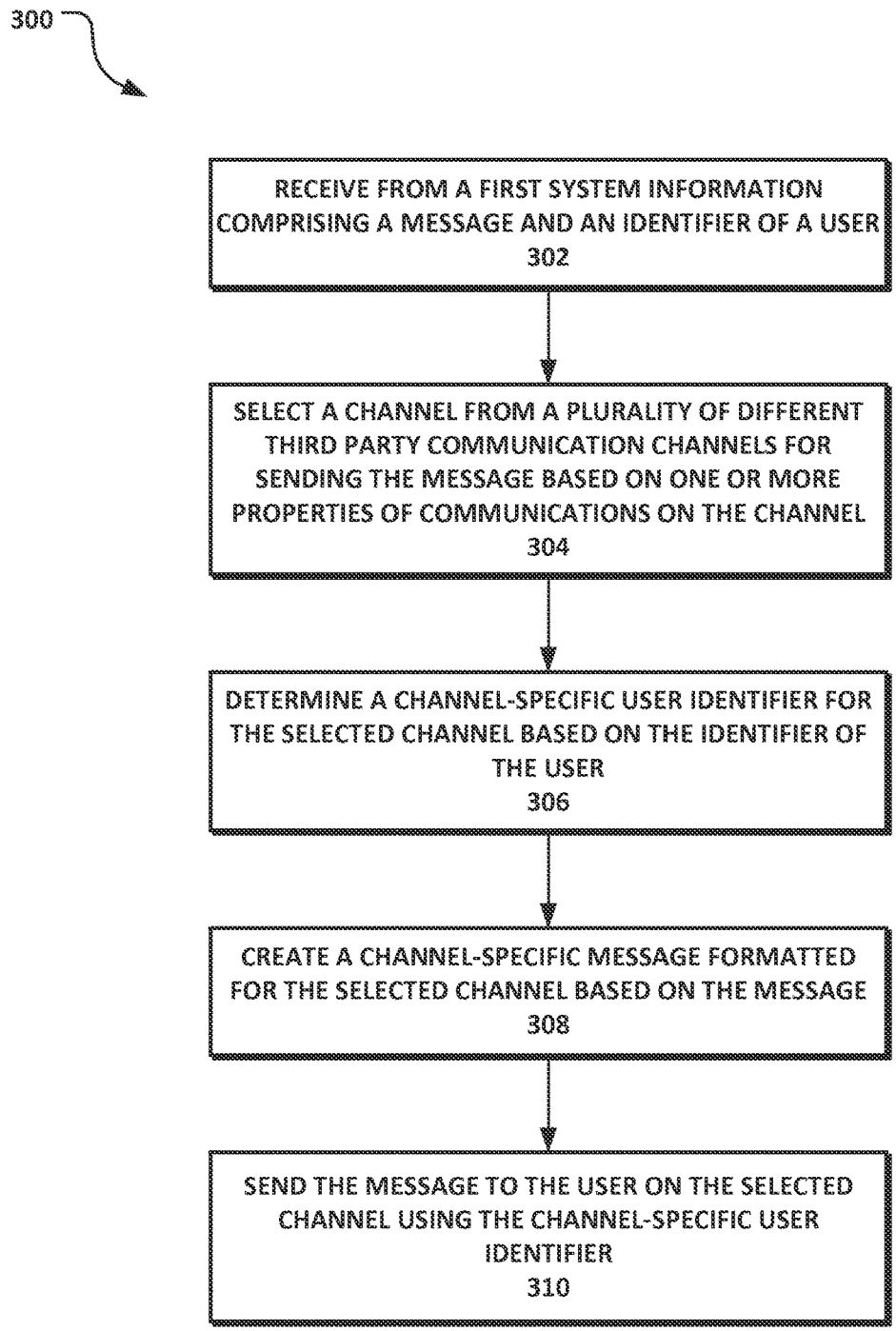
FIG. 4 is a flow chart depicting an example method for automatic channel selection.

FIG. 4 is a flow chart of an example method for flexible message delivery. The method can be implemented using software components executing on one or more data processing apparatus that are part of the data center 121 described earlier. The method begins by receiving from a first system information comprising a message and an identifier of a user (step 302; e.g., channel manager 114). The method selects a channel from a plurality of different third party communication channels for sending the message based on one or more properties of communications on the channel (step 304; e.g., channel manager). The method determines a channel-specific user identifier for the selected channel based on the identifier of the user (step 306; e.g., channel manager 114). The method creates a channel-specific message formatted for the selected channel based on the message (step 308; e.g., channel adapter 116). The method sends the message to the user on the selected channel using the channel-specific user identifier (step 310; e.g., channel adapter 116).

Figure 5:
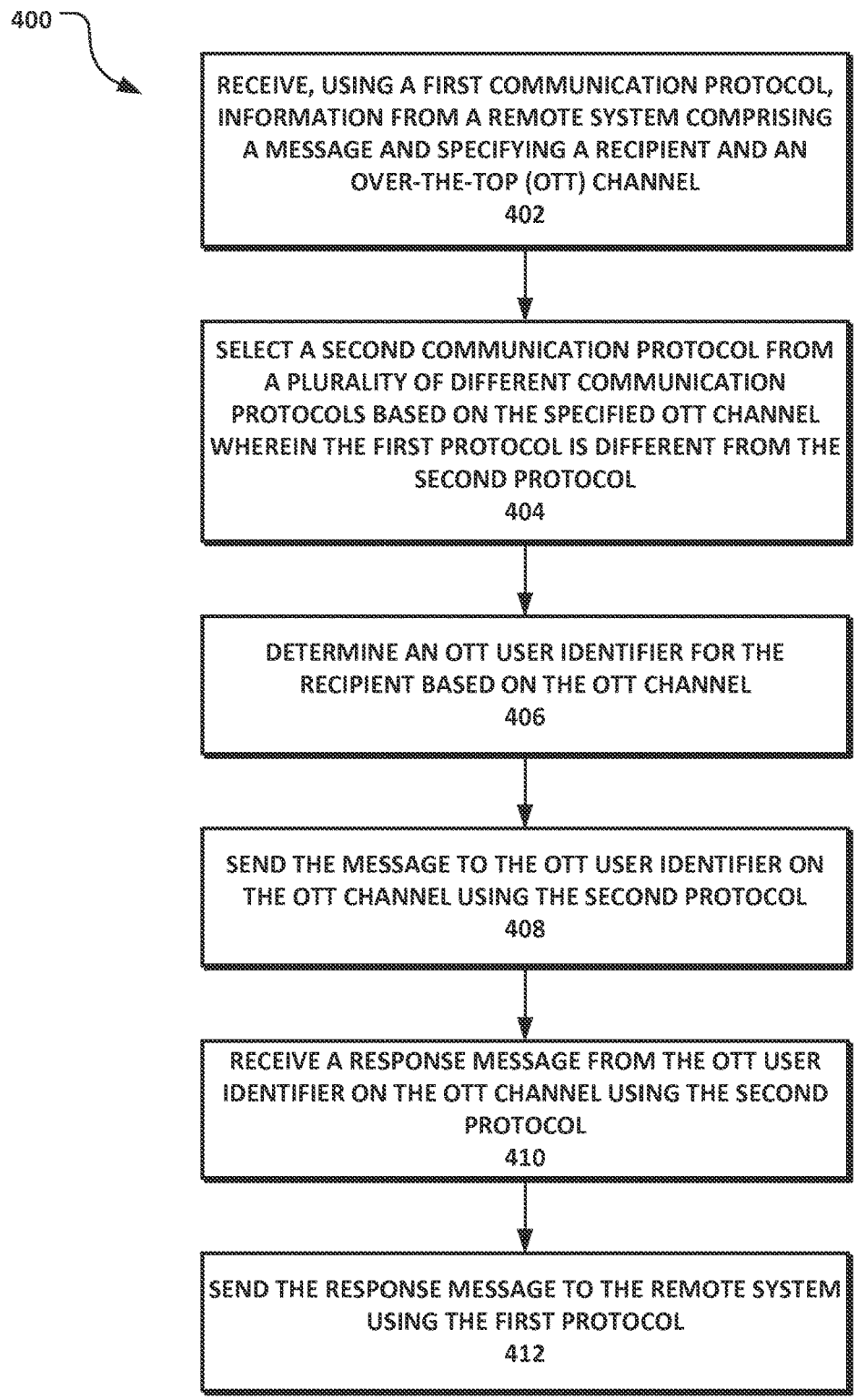
FIG. 5 is a flow chart depicting an example method for bidirectional communication.

FIG. 5 is a flow chart for another example method for flexible message delivery. The method can be implemented using software components executing on one or more data processing apparatus that are part of the data center 121 described earlier. The method begins by receiving, using a first communication protocol, information from a remote system comprising a message and specifying a recipient and an Over-the-Top (OTT) channel (step 402; channel manager 114). The method selects a second communication protocol from a plurality of different communication protocols based on the specified OTT channel wherein the first protocol is different from the second protocol (step 404; channel manager 114). The method determines an OTT user identifier for the recipient based on the OTT channel (step 406; channel manager 114). The method sends the message to the OTT user identifier on the OTT channel using the second protocol (step 408; channel adapter 116). The method receives a response message from the OTT user identifier on the OTT channel using the second protocol (step 410; channel adapter 116). The method sends the response message to the remote system using the first protocol (412).

Various network metrics, channel properties (such as those described above), and other factors can also be used to select a route for message or other data transmission. Certain factors can be tracked over time (e.g., route quality, reachability, delivery receipt availability), whereas other factors can be relatively static (e.g., cost, regulations, user preferences). Factors can be tracked on a per route and/or per channel basis, and routing decisions can be made based on the factors associated with routes and/or channels over the routes.

Figure 6:
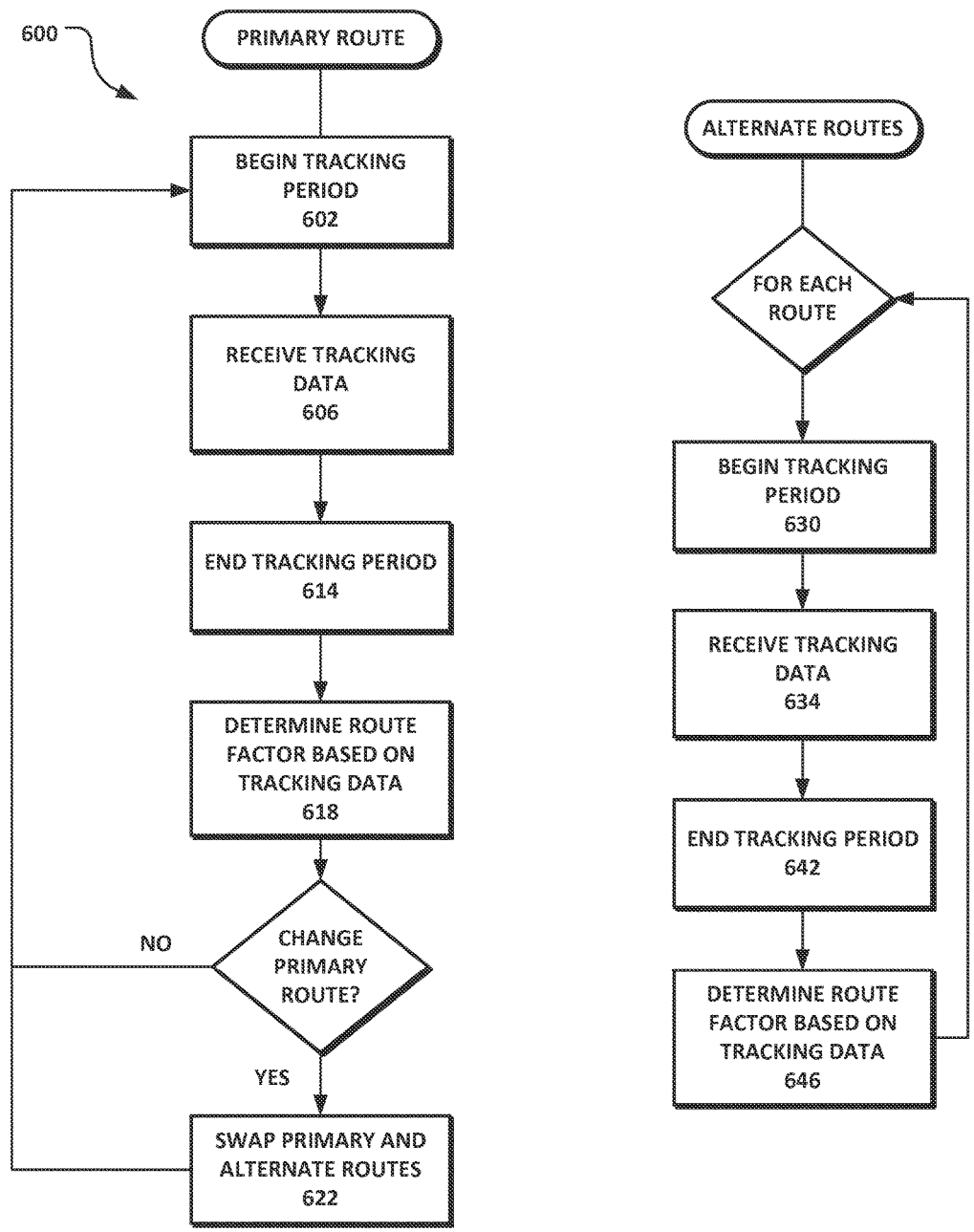
FIG. 6 is a flow chart depicting an example method for performing routing according to an implementation.

FIG. 6 depicts one implementation of a method 600 for performing routing. In STEP 602, a tracking period is started for a primary network route (e.g., by application 15 in FIG. 1). The tracking period is a window of time (e.g., 2 minutes, 3 minutes, 5 minutes, 7 minutes, 10 minutes, etc.) during which various data can be collected for determining one or more factors with respect to a channel and/or route (e.g., route quality). The window of time can be sized based on, for example, a minimum data sample size required to obtain a reasonably accurate historical quality measurement. Routes over which a greater amount of measurable events occurs can require shorter windows than routes over which a smaller amount of such events occurs. For instance, a primary route carrying 80% of messages used to provoke conversions can have a 5-minute tracking period, whereas alternate routes which carry the remaining 20% can each have a 20-minute tracking period.

During the tracking period, traffic can be transmitted over the primary route (by or through, e.g., application 15 or another traffic source). The traffic can include OTT messages, text messages (e.g., SMS), multimedia messages (e.g., MMS), voice calls, and other forms of messages. In some instances, the foregoing types of traffic include identity verification information such as activation, confirmation, or registration codes, PINs, unique identifiers, or other identifying data. The application 15 can receive data associated with the route or channel factor being tracked (e.g., an indication for each transmission of a message over the primary route) (STEP 606). The tracked data can be received from the message transmitter (e.g., the application 15) or other traffic source and can be, for example, indications that a particular message was sent and/or received during the tracking period.

In one implementation, the tracking data is used to measure a conversion ratio and, thereby, the quality of a particular route. For instance, during the tracking period, network quality data associated with the primary route and/or traffic over the primary route (e.g., conversions, bandwidth, latency, loss, jitter, etc.) can be collected and, in some instances, conversions can be generated and collected. In one example, the application 15 receives zero or more indications of conversion during the tracking period. The indications of conversion can be received directly or indirectly from servers that perform delivery tracking, authentication, or other verification processes, and can be based on previously transmitted messages. If, for example, during the tracking period, a user is sent a text message with a PIN code that can be used to authenticate the user on a banking website, and the user successfully logs into the website during the tracking period, an indication of such conversion can be received and tracked as route quality data. No conversion will occur, however, if the intended recipient never receives the transmitted message with the identity verification information. Further, if a conversion occurs after the tracking period, or the indication of conversion is received after the tracking period, no conversion is considered to have occurred for purposes of tracking the route quality. Moreover, indications of conversion received during the tracking period but that are based on messages transmitted prior to the tracking period can be ignored for purposes of route quality measurement as well.

In some implementations, only certain message transmissions and their consequent conversions are counted during a tracking period. For instance, the application 15 might track a subset of message transmissions based on the likelihood that the message recipient will, if he receives the message, take the necessary action to complete a conversion. As an example, consider a user that is attempting to create a new account on a financial website. In order to complete the registration (i.e., perform the conversion), the user must enter an activation code sent to his mobile phone via text message. This user has a higher likelihood of entering the code and successfully creating his account than a user who is provided a similar code for reading an online entertainment blog. The former user has a greater incentive to complete the conversion than the latter user, who may not find it worth the trouble. Accordingly, the application 15 can collect data relating only to certain uses (e.g., account registration, purchases, etc.) and/or message sources (e.g., banking websites, e-commerce websites, etc.) to ensure a more accurate reflection of the route quality. In other words, the conversion ratio for the route (conversions over messages transmitted) should reflect to the extent possible that conversion failures arose from failures in message transmission rather than users declining to complete conversions.

Figure 7:
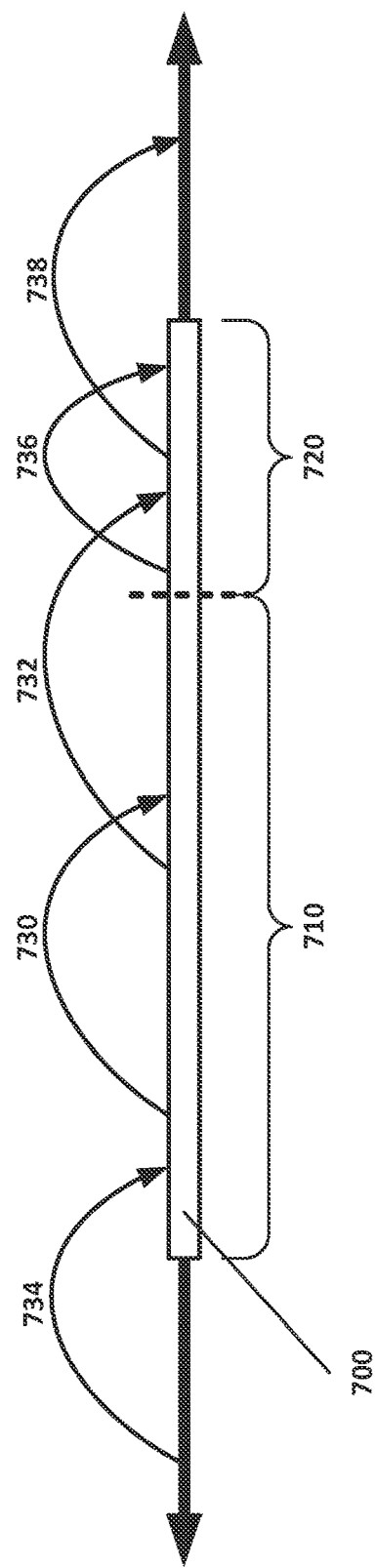
FIG. 7 is a diagram of a route factor tracking period according to an implementation.

In one implementation, the tracking period includes an end portion during which message transmissions are no longer tracked for purposes of determining route quality over that window of time, but conversions based on messages transmitted during the start portion are counted. This ensures that messages transmitted toward the latter part of the start portion have sufficient time to result in conversions. For example, as illustrated in FIG. 7, a tracking period 700 can be 7 minutes long, with a 5-minute start portion 710 and a 2-minute end portion 720. Indications of message transmissions and subsequent conversions received entirely within the start portion 710 (illustrated by arrow 730) are considered for a determination of route quality for tracking period 700, as are indications of conversion received during the end portion 720 that are based on messages transmitted during the start portion 710 (illustrated by arrow 732). On the other hand, in some implementations, one or more of the following are not used for calculating route quality for the tracking period 700: indications of conversion received during the tracking period 700 that are based on messages transmitted prior to the tracking period 700 (illustrated by arrow 734); indications of message transmissions received during the end portion 720, whether or not a respective indication of conversion is received within the end portion 720 (illustrated by arrows 736 and 738); and indications of conversion received after the tracking period 700, regardless of when the associated indication of message transmission was received (illustrated by arrow 738).

Referring again to FIG. 6, following the end of the tracking period (STEP 614), the application 15 determines the primary route factor (e.g., quality) based on data collected during the tracking period (STEP 618). In one implementation, the quality of a route is determined by calculating the ratio of received indications of conversion to received indications of message transmissions over the tracking period, and comparing the ratio to one or more similarly calculated ratios for previous tracking periods to identify whether a reduction in the conversion percentage (and thereby a decrease in the primary route quality) has occurred. For example, if during a first tracking period 100 messages are transmitted and 80 conversions occur, the calculated conversion ratio is 80/100, or 80%. During the next tracking period, 120 messages are transmitted and 48 conversions are received, resulting in a conversion ratio of 48/120, or 40%. Accordingly, over the two tracking periods, a reduction in route quality has occurred, namely, a decrease of 50% in the conversion ratio. Other methods of determining route quality are contemplated.

In STEP 622, based on the evaluation of one or more route factors (which can be measured/identified over one or more tracking periods), an alternate route can be selected to replace the primary route (and, in some instances, the primary route can become an alternate route). The replacement primary route can be configured to accept the same or a different percentage of traffic as the former primary route (e.g., the traffic percentage can be increased from 80% to 85% if the new route has greater capacity).

In determining whether the primary route should be replaced, consideration can be given to one or more of the following factors: whether there has been a change in the value of a route factor (e.g., a decrease in route quality) from the last tracking period that exceeds a particular threshold; whether there has been a change in the value of a route factor (e.g., a decrease in route quality) over a number of previous periods (e.g., average reduction over the periods, maximum or minimum reduction over the periods, reduction between the first and last period, etc.) that meets a particular threshold; whether the value of a particular factor is less than a minimum permitted value; whether an alternate route is available; whether an alternate route having route factor value that meets a minimum required value is available; whether an alternate route having a route factor value that exceeds the primary route factor value by a threshold amount is available; and whether the primary route has already been replaced within a previous number of periods. As one example, with respect to the measurement of route quality, if the quality of the primary route falls below 50% and/or the quality decreases by at least 5% from the previous tracking period, and an alternate route that has a better quality is available, the primary route and the best alternate route can be exchanged.

Other methods or factors instead of or in addition to route quality and the ratio calculation described above can be used to determine whether the primary route should be replaced and/or which alternate route to select. In some implementations, a decision whether to replace the primary route can be based at least in part on predictive methods, allowing the primary route to be preemptively exchanged before its quality or other factor value decreases to an extent that would otherwise prompt a change (or not exchanged, if a predictive method indicates that the route quality or other factor value will increase or remain stable). One such predictive method includes a measure of risk, such as a risk that the primary route quality or other factor value will change (e.g., decrease) more than a threshold amount over a period of time. There are various ways to measure risk, one of which is value at risk (VaR), used prominently in the financial field. For example, given a particular route, a probability and a time period, the VaR can be defined as a threshold value such that the probability that a change in route quality or other factor value exceeds the threshold value is the given probability. Based on conversion data or other metrics, the VaR can be used to validate the need for a switch of routes otherwise identified using the route data/metrics. In some cases, the VaR can contradict the need for a switch identified by the data (based on, past trends, queuing, etc.) or can identify a better time to make the swap (e.g., wait a period of time before switching).

In one implementation, the determination of a likelihood that the primary route will need to be replaced is facilitated or automatically performed using machine learning, pattern recognition, data mining, statistical correlation, artificial neural networks, or other suitable known techniques. In one example, a classifier (e.g., a suitable algorithm that categorizes new observations) can be trained over time using various historical attributes associated with a route, a channel, and/or route/channel traffic, such as historical conversion ratios, quality, number of hops, carrier, a time or date associated with route traffic, geographical location (e.g., of a hop in the route), transmission cost, and other historical performance data (e.g., loss, delay, latency, available bandwidth, used bandwidth, jitter, etc.). The training data can be used by the classifier to learn whether a particular value of an attribute or combination thereof, at a point in time or over a period of time, reflects a likelihood that the primary route will be replaced. Attributes of a particular route can then be input to the classifier in order to obtain a prediction of, for example, whether the primary route quality is likely to decrease (and thus should be replaced). With respect to this example, if the classifier receives as input information indicating the current server time, the carrier location, and that the primary route quality has decreased 2% since the previous tracking period, the classifier might return as output a 75% likelihood that the route quality will further decrease over the next time period, necessitating a change in the primary route. This can occur if, for example, the classifier has learned, based on training data, that traffic sent around that time through that carrier has a high probability of deteriorating further in quality if a decrease in quality has previously occurred. The various route and channel factors described herein can also be provided as input to a classifier or other machine learning functionality to determine the likelihood that the primary route will need to be replaced with a secondary route during a future time period.

In one implementation, a monetary factor (e.g., cost, revenue, profit margin, etc.) can be considered instead of or in combination with route quality or other route, channel, or traffic attributes to determine which, if any, alternate route should be exchanged with the primary route. For example, an alternate route can be selected based at least in part on the profit margin associated with use of the route. In one case, the alternate route with the highest profit margin can be selected to replace the primary route. In another implementation, if a group of alternate routes have a route quality within a certain proximity (e.g., +/−1%, +/−5%, +/−10%, etc.), the alternate route in the group with the highest profit margin can be selected. In a further implementation, route quality and profit margin (and/or other factors) can be weighted (e.g., 75% quality, 25% margin) and combined to create a weighted rating for each alternate route, and the route with the highest weighted rating can be selected to replace the primary route. Other factors can be used in alternate route selection, such as available bandwidth, historical quality, whether the route is queuing, and so on.

In another implementation, the properties associated with one or more channels (see TABLE 1) over routes are used, at least in part, to determine whether to switch from a primary route to a secondary route for message transmission. For example, the quality of service, receipt delivery, recipient reachability, and/or delivery cost for a channel (or a combination of channels) on the primary route and secondary routes can be measured over time, in a similar manner to the measurement of route quality, as described above. For example, if, over a tracking period, the average time to receive a delivery receipt on a primary route channel increases to exceed a threshold amount, the channel and/or the route itself can be changed to a secondary channel/route (e.g., switch from an SMS channel on a primary route to a voice channel on a secondary route).

In other instances, user preferences or regulations associated with a particular channel or route can be considered in determining whether to use a secondary route for transmission. For example, if a secondary route becomes available that is designated as favored, the secondary route can be selected for use instead of a currently used primary route. It is to be appreciated that multiple channel and route properties can be considered in combination with each other and, in some instances, in combination with other route or traffic factors. As one example, a secondary route is switched to only if communication regulations permit the use of one or more channels over the route, and the route has a data transmission cost that is lower than a maximum cost threshold, and the route quality exceeds a minimum quality threshold. Other combinations are contemplated.

Whether or not a change is made to the primary route, a new tracking period can begin following the end of the current tracking period. Alternatively, tracking periods can overlap. For example, in the case of tracking route quality, if a tracking period has an end portion during which conversions are counted but message transmissions are not tracked for that period (see, e.g., FIG. 7 and accompanying text, above), a subsequent tracking period can commence at the start of the end portion, effectively overlapping the end portion. Thus, the subsequent tracking period can begin prior the end of the previous tracking period, and prior to a determination of route quality based on data collected during that previous period.

In some implementations, route factor data for one or more alternate routes is collected simultaneously with the tracking of route factor data for the primary route, as described above. As shown in FIG. 6, the application 15 starts a tracking period for each observed alternate route (STEP 630). As with the primary route, the window of time for an alternate route tracking period can be sized based on, for example, a minimum data sample size required to obtain a reasonably accurate measurement of the particular factor (s). If fewer measurable events occur over in an alternate route over a certain period of time as compared to the primary route (e.g., because the alternate route has less traffic flowing through it), the alternate route tracking period can be longer in order to capture a sufficient number of events. Each alternate route can have a tracking period of the same length, or some or all alternate routes can have tracking periods of different lengths.

During the tracking period, traffic can be transmitted over an alternate route (by or through, e.g., application 15 or another traffic source). The traffic can include text messages (e.g., SMS), multimedia messages (e.g., MMS), voice calls, and other forms of messages. In some instances, the foregoing types of traffic include identity verification information such as activation, confirmation, or registration codes, PINs, unique identifiers, or other identifying data. The application 15 can receive tracking data regarding the alternate route (e.g., indication for each transmission of a message over the alternate route) (STEP 634). The tracking data can be received from the message transmitter (e.g., the application 15) or other traffic source and can be, for example, indications that a particular message was sent and/or received during the tracking period.

Further, during the tracking period, network quality data associated with the alternate route and/or traffic over the alternate route (e.g., conversions, bandwidth, latency, loss, jitter, etc.) can be collected and, in some instances, conversions can be generated and collected. In one implementation, the application 15 receives zero or more indications of conversion during the tracking period. The indications of conversion can be received directly or indirectly from servers that perform delivery tracking, authentication, or other verification processes, and can be based on previously transmitted messages. If, for example, during the tracking period, a user is sent a text message with a PIN code that can be used to authenticate the user on a banking website, and the user successfully logs into the website during the tracking period, an indication of such conversion can be received and tracked as route quality data. However, if the conversion occurs after the tracking period, or the indication of conversion is received after the tracking period, no conversion is considered to have occurred for purposes of tracking the route quality. Moreover, indications of conversion received during the tracking period but that are based on messages transmitted prior to the tracking period can be ignored for purposes of route quality measurement as well. The tracking period can include start and end portions as described with respect to the primary route and illustrated in FIG. 7.

Other data associated with alternative routes and/or channels can be collected during a tracking period, in a manner similar to that described above with respect to the primary route/channel.

Following the end of the tracking period (STEP 642), the application 15 determines the value of the route factor of the particular alternate route based on data collected during the tracking period (STEP 646). In one implementation, the quality of the route is determined by calculating the ratio of received indications of conversion to received indications of message transmissions over the tracking period, and comparing the ratio to one or more similarly calculated ratios for previous tracking periods to identify whether a reduction in the conversion percentage (and thereby a decrease in the alternate route quality) has occurred. For example, if during a first tracking period 100 messages are transmitted and 80 conversions occur, the calculated conversion ratio is 80/100, or 80%. During the next tracking period, 120 messages are transmitted and 48 conversions are received, resulting in a conversion ratio of 48/120, or 40%. Accordingly, over the two tracking periods, a reduction in route quality has occurred, namely, a decrease of 50% in the conversion ratio. Other methods of calculating route quality are contemplated. The application 115 can then use the quality data associated with the alternate routes in selecting a replacement primary route, if necessary.

Whether or not a change is made to the primary route, a new tracking period for an alternate route can begin following the end of the current tracking period. Alternatively, tracking periods can overlap. For example, if a tracking period has an end portion during which conversions are counted but message transmissions are not tracked for that period (see, e.g., FIG. 7 and accompanying text, above), a subsequent tracking period can commence at the start of the end portion, effectively overlapping the end portion. Thus, the subsequent tracking period can begin prior the end of the previous tracking period, and prior to a determination of route quality based on data collected during that previous period.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
    identifying a primary route being used to transmit a plurality of messages, wherein the primary route comprises one or more channels each associated with a particular message type;
    identifying one or more alternate routes for potentially transmitting the plurality of messages, wherein each alternate route comprises one or more channels each associated with a particular message type;
    tracking over a period of time an average length of time to receive delivery receipt messages for messages transmitted over a particular channel of the primary route;
    evaluating at least one factor associated with the primary route with respect to at least one corresponding factor associated with each alternate route, wherein the at least one factor comprises channel delivery receipt delay, and wherein evaluating the factor comprises determining that the delivery receipt delay of the particular channel of the primary route exceeds a maximum delay threshold; and
    based on the evaluation, determining whether one of the alternate routes should replace the primary route for transmission of the plurality of messages.

2. The method of claim 1, wherein the at least one factor further comprises one of quality of service, delivery receipt availability, recipient reachability, cost, and/or user preference.

3. The method of claim 1, further comprising:
    tracking over a period of time first network metric data of a channel of the primary route and second network metric data of a channel of a particular alternate route, wherein the at least one factor further comprises channel quality of service, and wherein evaluating the factor comprises:
        determining, based on the first network metric data, a quality of service of the channel of the primary route; and
        determining, based on the second network metric data, a quality of service of the channel of the particular alternate route.

4. The method of claim 1, wherein the delivery receipt messages are received via the same channel of the primary route over which messages are transmitted.

5. The method of claim 1, further comprising:
    receiving indications of transmission of a subplurality of messages wherein the transmission occurs over the primary route; and
    receiving, for at least one of the subplurality of messages, an indication of a conversion based on the at least one message,
    wherein the at least one factor further comprises route quality, and wherein evaluating the factor comprises determining a quality of the primary route based on at least a subset of the indications of transmission and at least a subset of the indications of conversion.

6. The method of claim 5, wherein a particular conversion comprises a verification of delivery of the message based on a response to the message.

7. The method of claim 1, wherein evaluating the at least one factor comprises predicting whether a change in a value of the at least one factor is likely to occur.

8. The method of claim 7, wherein the predicting is based on a risk measure.

9. The method of claim 7, wherein the predicting is based on historical attributes associated with the primary route.

10. The method of claim 1, wherein determining whether an alternate route should replace the primary route comprises selecting one of the plurality of alternate routes based at least in part on the corresponding at least one factor associated with selected alternate route.

11. The method of claim 1, further comprising redesignating the primary route as an alternate route.

12. The method of claim 1, wherein a particular message type comprises identity verification information.

13. The method of claim 1, wherein a particular message type comprises a text message, a multimedia message, or a voice message.

14. The method of claim 1, wherein the delivery receipt messages are received via the same channel of the primary route over which messages are transmitted.

15. A system comprising:
    one or more computers programmed to perform operations comprising:
        identifying a primary route being used to transmit a plurality of messages, wherein the primary route comprises one or more channels each associated with a particular message type;
        identifying one or more alternate routes for potentially transmitting the plurality of messages, wherein each alternate route comprises one or more channels each associated with a particular message type;
        tracking over a period of time an average length of time to receive delivery receipt messages for messages transmitted over a particular channel of the primary route;
        evaluating at least one factor associated with the primary route with respect to at least one corresponding factor associated with each alternate route, wherein the at least one factor comprises channel delivery receipt delay, and wherein evaluating the factor comprises determining that the delivery receipt delay of the particular channel of the primary route exceeds a maximum delay threshold; and based on the evaluation, determining whether one of the alternate routes should replace the primary route for transmission of the plurality of messages.

16. The system of claim 15, wherein the at least one factor further comprises one of quality of service, delivery receipt availability, recipient reachability, cost, and/or user preference.

17. The system of claim 15, wherein the operations further comprise:

tracking over a period of time first network metric data of a channel of the primary route and second network metric data of a channel of a particular alternate route, wherein the at least one factor further comprises channel quality of service, and wherein evaluating the factor comprises:

determining, based on the first network metric data, a quality of service of the channel of the primary route; and determining, based on the second network metric data, a quality of service of the channel of the particular alternate route.

18. The system of claim 15, wherein the operations further comprise:

receiving indications of transmission of a subplurality of messages wherein the transmission occurs over the primary route; and receiving, for at least one of the subplurality of messages, an indication of a conversion based on the at least one message, wherein the at least one factor further comprises route quality, and wherein evaluating the at least one factor comprises determining a quality of the primary route based on at least a subset of the indications of transmission and at least a subset of the indications of conversion.

19. The system of claim 18, wherein a particular conversion comprises a verification of delivery of the message based on a response to the message.

20. The system of claim 15, wherein evaluating the at least one factor comprises predicting whether a change in a value of the at least one factor is likely to occur.

21. The system of claim 20, wherein the predicting is based on a risk measure.

22. The system of claim 20, wherein the predicting is based on historical attributes associated with the primary route.

23. The system of claim 15, wherein determining whether an alternate route should replace the primary route comprises selecting one of the plurality of alternate routes based at least in part on the corresponding at least one factor associated with selected alternate route.

24. The system of claim 15, wherein the operations further comprise redesignating the primary route as an alternate route.

25. The system of claim 15, wherein a particular message type comprises identity verification information.

26. The system of claim 15, wherein a particular message type comprises a text message, a multimedia message, or a voice message.

* * * * *